US007451645B2

(12) United States Patent
Niebauer et al.

(10) Patent No.: US 7,451,645 B2
(45) Date of Patent: Nov. 18, 2008

(54) TEST MASS FOR GRAVIMETERS AND GRADIOMETERS

(75) Inventors: Timothy M. Niebauer, Boulder, CO (US); Ryan M. Billson, Loveland, CO (US); Fred J. Klopping, Longmont, CO (US); Jess G. Valentine, Erie, CO (US); Derek C. S. van Westrum, Boulder, CO (US)

(73) Assignee: Micro-g LaCoste, Inc., Lafayette, CO (US)

( * ) Notice: Subject to any disclaimer, the term of this patent is extended or adjusted under 35 U.S.C. 154(b) by 0 days.

(21) Appl. No.: 11/315,643

(22) Filed: Dec. 22, 2005

(65) Prior Publication Data

US 2006/0130575 A1 Jun. 22, 2006

Related U.S. Application Data

(60) Provisional application No. 60/639,956, filed on Dec. 22, 2004.

(51) Int. Cl.
  *G01V 7/00* (2006.01)
(52) U.S. Cl. .............. 73/300; 73/382 R; 73/382 G
(58) Field of Classification Search ........... 73/382 R, 73/382 G, 300; 702/189; 356/35.5
  See application file for complete search history.

(56) References Cited

U.S. PATENT DOCUMENTS

| | | | | |
|---|---|---|---|---|
| 2,150,405 A * | 3/1939 | Scherbatskoy | ........... | 73/382 R |
| 3,062,051 A | 11/1962 | Slater et al. | ........... | 73/382 R |
| 3,413,854 A * | 12/1968 | Graf | ........... | 73/382 R |
| 3,500,688 A * | 3/1970 | Hudson | ........... | 73/382 R |
| 3,583,226 A | 6/1971 | Codina | ........... | 73/382 R |
| 5,351,122 A * | 9/1994 | Niebauer et al. | ........... | 356/496 |
| 5,892,151 A * | 4/1999 | Niebauer et al. | ........... | 73/382 R |
| 6,298,722 B1 | 10/2001 | Faller et al. | ........... | 73/382 R |
| 6,606,908 B2* | 8/2003 | Johann et al. | ........... | 73/514.19 |
| 2002/0036251 A1* | 3/2002 | Johann et al. | ........... | 244/158 R |
| 2003/0136190 A1 | 7/2003 | Araya | ........... | 73/382 R |
| 2005/0027489 A1 | 2/2005 | Kasevich et al. | ........... | 702/189 |

FOREIGN PATENT DOCUMENTS

JP   51059796 A * 5/1976
JP   02126181 A * 5/1990

(Continued)

OTHER PUBLICATIONS

Crooks et al., Excess mechanical loss associated withteh dielectric mirror coating on the test masses in interferometric gravitational wave detectors, 2002, Institute of Physics Publishing, Classical Quantum Gravity 19,p. 883-896.*

(Continued)

*Primary Examiner*—Herzron D Williams
*Assistant Examiner*—Tamiko D Bellamy
(74) *Attorney, Agent, or Firm*—John R. Ley; Jennifer M. McCallum

(57) ABSTRACT

The present invention provides devices and methods for reducing or eliminating sources of systematic errors in the measurement of absolute gravity or gravity field gradients; specifically, an improved test mass for an interferometer is disclosed that reduces the influence of nearby electromagnetic fields on a freefalling test mass.

32 Claims, 4 Drawing Sheets

FOREIGN PATENT DOCUMENTS

RU    1831699 A3 *  7/1993

OTHER PUBLICATIONS

Y. Jiang et al., Optical properties of metallo-dielectric microspheres in opal structures, 2003, Institute of Physics Publishing, Journal Of Physics Condensed Matter 15, p. 5871-5879.*

Schmitt et al., Particle design for displacement tracking velocimetry, 1995, Meas. Science Technology 6, p. 682-689.*

Niebauer, T. M., et al. (1995) *Metrologia* 32:159-180.

* cited by examiner

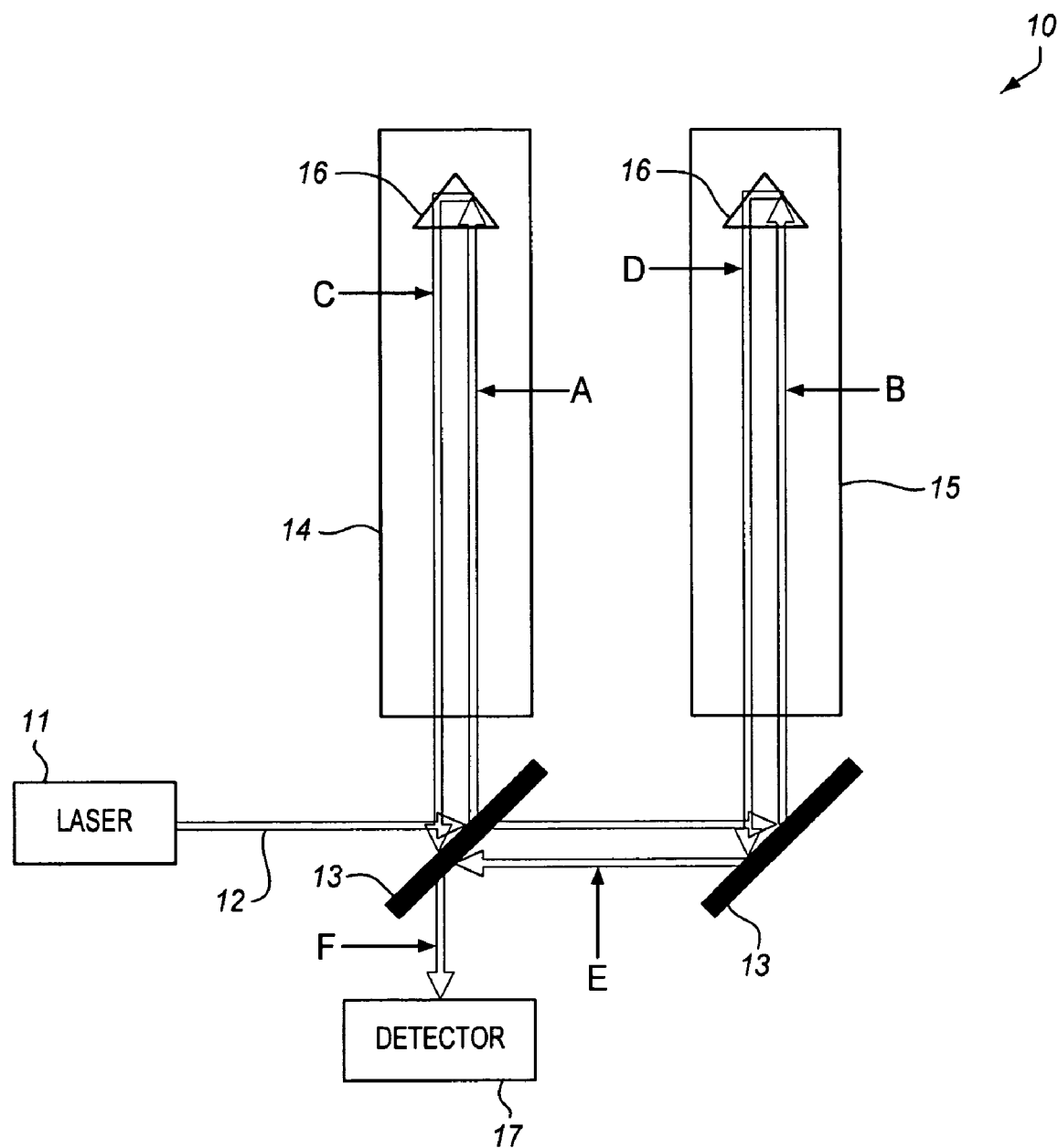

TEST MASS FOR GRAVIMETERS AND GRADIOMETERS

FIELD OF THE INVENTION

The present invention relates to the measurement of absolute gravity and gravity field gradients using a measuring apparatus incorporating a test mass that is designed to avoid inaccuracies associated with nearby electromagnetic fields.

BACKGROUND OF THE INVENTION

Typical absolute gravimeters and gradiometers operate by tracking the freefall of an object, or "test mass", within an instrument known as an interferometer. An interferometer contains a laser beam that is split into two paths, each portion of the laser beam reflects off a retro-reflector, contained within a test mass located in a vertical chamber. In one vertical chamber, a test mass containing a retro-reflector is placed in freefall. In the second vertical chamber, if the retro-reflector is held fixed, the signal at the combined output of the two beams can be used to determine the acceleration of gravity (g). If the retro-reflectors in both chambers are placed in freefall, the signal at the combined output of the two beams can be used to determine the gradient of the gravity field between the two objects.

Because forces that act upon a test mass during freefall may alter its acceleration (and hence the gravity measurement), the choice of material used to make the test mass is critical. For example, some forces that might act upon a test mass include frictional drag, micro-accelerations due to out-gassing of the mass itself, and attractive and repulsive electromagnetic forces. Frictional drag on the test mass may be reduced to a negligible effect by evacuation of the vertical chambers, and out-gassing can be avoided by a suitable choice of test mass materials. However, the influence of electric and magnetic fields is difficult to remove because gravity meters often employ electric components such as vacuum pumps, drive motors and computer circuitry.

As any electrically-conductive object falls through an electromagnetic field, it is susceptible to attractive and repulsive forces. The forces can include direct electric attraction or repulsion (positive and negative charges interacting), magnetic attraction or repulsion (north and south poles interacting), or a combination of the two. For example, an interferometer test mass incorporating a magnetic material will be attracted or repelled by external magnetic fields caused by magnetic devices or the earth's magnetic field. Any external magnetic field will induce a flow of free electrons, called an eddy current, in an accelerating conductive object. This eddy current creates its own magnetic field, which attracts or repels the original magnetic field, thus creating an additional force on the freely falling test mass.

All of these electromagnetic forces can alter the freefall course or rate of freefall of the test mass and cause a non-negligible change in a measured gravity value. For this reason, attempts have been made to minimize the influence that electrical and/or magnetic components have on a measurement. For example, vertical chambers have been surrounded with shielding material and electrical components have been placed as far away from a test mass as possible. These shielding and isolation approaches, however, lead to excessively large and heavy instruments due to the weight of the shielding material and the distal placement of the electrical components. Additionally, it is not desirable to manufacture a test mass of entirely non-conducting material, because a non-conducting mass will build-up charge (static electricity). This built-up charge will cause electrostatic attraction or repulsion between the test mass and a conductor or other charged surface, resulting in disturbance of the freefall measurement. In addition, a large charge can damage electrical equipment.

A smaller, lighter system that experiences minimal effects from nearby electric or magnetic fields is needed. Such a system would reduce the cost and burden of transporting an interferometer to a test site; would improve the accuracy with which gravity can be measured; and would allow systems to be used in areas encumbered by large electric or magnetic fields (e.g., near power plants, quarries, pump houses, etc.).

SUMMARY OF THE INVENTION

The present invention provides devices and methods for reducing or eliminating sources of systematic errors in the measurement of absolute gravity or gravity field gradients; specifically, an improved test mass for an interferometer is disclosed that reduces the influence of nearby electromagnetic fields on a freefalling test mass.

According to an embodiment of the present invention, a test mass may be manufactured from a non-conductive material and coated with a thin conductive layer. Non-conductive materials are less apt than conductive materials to develop eddy currents when moved through stray magnetic fields (including the earth's), and thus drag effects on non-conductive materials are reduced relative to conductive materials. According to a particular embodiment of the present invention, a non-conductive material is coated with a thin layer of electrically conductive film such that eddy current formation is negligible and the test mass may discharge any possible built-up static charge when the test mass comes into contact with the (electrically grounded) test mass elevator.

According to another embodiment of the present invention, a test mass may be manufactured from a conductive material such that it forms a non-contiguous surface. For example, the test mass may contain slits, a plurality of holes or some other pattern of perforations. In a particular embodiment, between about 25% of the contiguous surface area of the test mass has been removed. The purpose of the holes is to disrupt the natural path of electrons, so that it is difficult for eddy currents to form. Specifically, the holes or perforations are designed to direct induced eddy currents in such a way that their interaction with the external magnetic field does not produce a force in the vertical direction. Horizontally induced forces from eddy currents do not alter the gravity or gradient measurement.

In yet another embodiment of the present invention, a test mass may be manufactured from a non-conductive material, coated with a thin conductive layer and perforated. In this embodiment the formation of eddy currents is inhibited by both the use of a non-conductive material and the introduction of slits, a plurality of holes or some other pattern of perforations.

In any of the above-described embodiments, the material used to manufacture the test mass must have negligible gaseous emission (i.e., low out-gassing) in a vacuum, because out-gassing may lead to micro-accelerations and thus inaccurate measurements.

One of skill in the art will readily understand that multiple conductive or non-conductive materials or coatings may be layered or combined in the manufacture of a test mass according to the present invention and still a similar result will be obtained without departing from the spirit and scope of the present invention.

BRIEF DESCRIPTION OF THE DRAWINGS

The following drawings form part of the present specification and are included to further demonstrate certain embodiments. These embodiments may be better understood by reference to one or more of these drawings in combination with the detailed description of specific embodiments presented herein. In the drawings, like numerals refer to like parts.

FIG. 1 illustrates a schematic of a typical interferometer-based gravimeter/gradiometer system.

DETAILED DESCRIPTION OF THE INVENTION

Figure 2A:
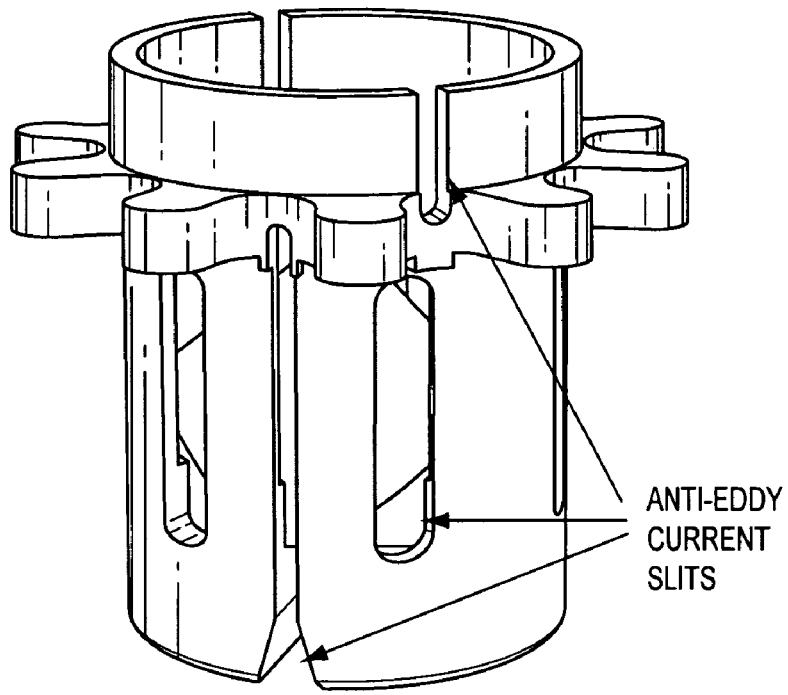
FIGS. 2A-2E illustrates test masses according to particular embodiments of the present invention.

The present invention provides devices and methods for reducing or eliminating sources of systematic errors in the measurement of absolute gravity or gravity field gradients; specifically, an improved test mass for an interferometer is disclosed that reduces the influence of nearby electrical and/or magnetic fields on a freefalling test mass.

Definitions

For the purposes of the present invention, the following terms shall have the following meanings:

For the purposes of the present invention, ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about", it will be understood that the particular value forms another embodiment. It will be further understood that the endpoints of each of the ranges are significant both in relation to the other endpoint, and independently of the other endpoint.

For the purposes of the present invention, an "electromagnetic" field shall describe an electric and/or magnetic field. It should be understood that electric and magnetic fields are related in that the presence of one type of field (electric or magnetic) may induce the presence of the other type of field (magnetic or electric), respectively.

For the purposes of the present invention, an "eddy current" is a flow of free electrons within a conductive body, where the flow of electrons (i.e., current) has been induced by a nearby magnetic field.

Moreover, for the purposes of the present invention, the term "a", "an" or "the" refers to one or more of that entity; for example, "a detector" or "an interferometer" refers to one or more of those elements or at least one of those elements. As such, the terms "a" or "an", "one or more" and "at least one" can be used interchangeably herein. It is also to be noted that the terms "comprising", "including", and "having" can be used interchangeably. Furthermore, a compound "selected from the group consisting of" refers to one or more of the compounds in the list that follows, including mixtures (i.e. combinations) of two or more of the compounds.

According to an embodiment of the present invention, a test mass may be manufactured from a non-conductive material and coated with a thin conductive layer, such as an antistatic coating. Exemplary non-conductive materials may be selected from the group consisting of crystalline materials, ceramic, plastic, rubber and the like, where crystalline materials include, for example, quartz, sapphire and diamond. Exemplary conductive layers may be selected from the group consisting of metals, metal alloys, conductive polymers and the like. In a certain embodiment, the thickness of the conductive layer is about 100 μm or less.

According to another embodiment of the present invention, a test mass may be manufactured from a conductive material such that it forms a non-contiguous surface. For example, the test mass may contain slits, a plurality of holes, or some other pattern of perforations. In a particular embodiment, between about 25% of the contiguous surface area of the test mass has been removed. Exemplary conductive materials include metals, metal alloys, conductive polymers and the like.

In yet another embodiment of the present invention, a test mass may be manufactured from a non-conductive material, coated with a thin conductive layer and perforated. In this embodiment the formation of eddy currents is inhibited by both the use of a non-conductive material and the introduction of slits, a plurality of holes or some other pattern of perforations.

In any of the above-described embodiments, the material used to manufacture the test mass may have negligible gaseous emission (i.e., low out-gassing) in a vacuum, because out-gassing may lead to micro-accelerations and thus inaccurate measurements. One of skill in the art will readily be able to select a suitable material with low out-gassing properties.

According to a particular embodiment of the present invention, a test mass is a cylinder with a diameter of about 50 mm, a depth of about 20 mm and a mass of about 60 g. In another particular embodiment, the test mass may have a shape other than cylindrical, e.g., spherical, rectangular, pyramidal or irregular.

In yet another particular embodiment of the present invention, instrumental uncertainty of an interferometer incorporating a test mass as described herein is about $1 \times 10^{-8}$ m·s$^{-2}$ or less.

In a particular embodiment of the present invention, it is beneficial to utilize a test mass as described herein when the test mass will be subjected to freefall conditions, or another form of translational movement.

FIG. 1 illustrates a schematic of a typical interferometer-based gravimeter/gradiometer system 10. An interferometer typically contains a laser 11 for generating a laser beam 12 and optic elements 13 for splitting, directing, and recombining the laser beam. When the laser beam 12 strikes the first optic element part of it is directed into a first chamber 14 along path A, another part of the laser beam passes through the first optic element and strikes the second optic element. The laser beam is then directed into a second chamber 15 along path B. The laser beams A and B each strike a retro-reflector 16, which forms part of a test mass that may be fixed or freefalling. Upon reflection from retro-reflectors 16, laser beams A and B are directed back to their respective optic elements along paths C and D, respectively. Laser beam D is reflected by the second optic element along path E and is eventually recombined with laser beam C along path F. A detector 17 measures the constructive or destructive interference of the combined beams F as a function of time and uses the measurement to calculate the acceleration of the test mass, or test masses relative to one another.

Figure 2B:
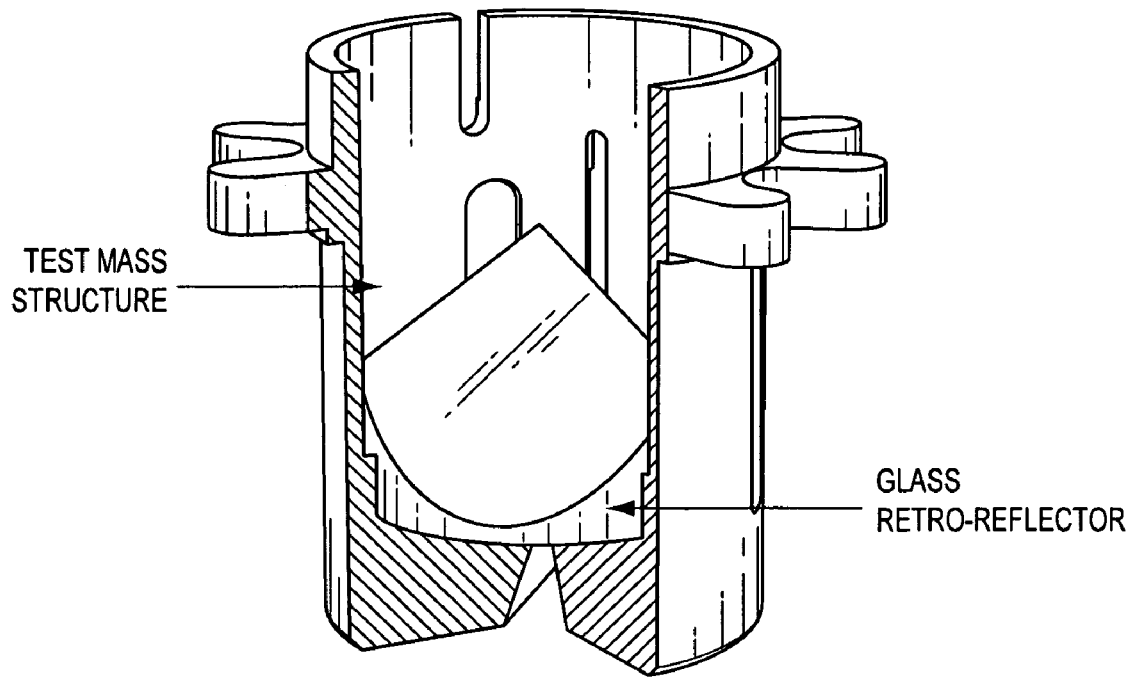
Figure 2C:
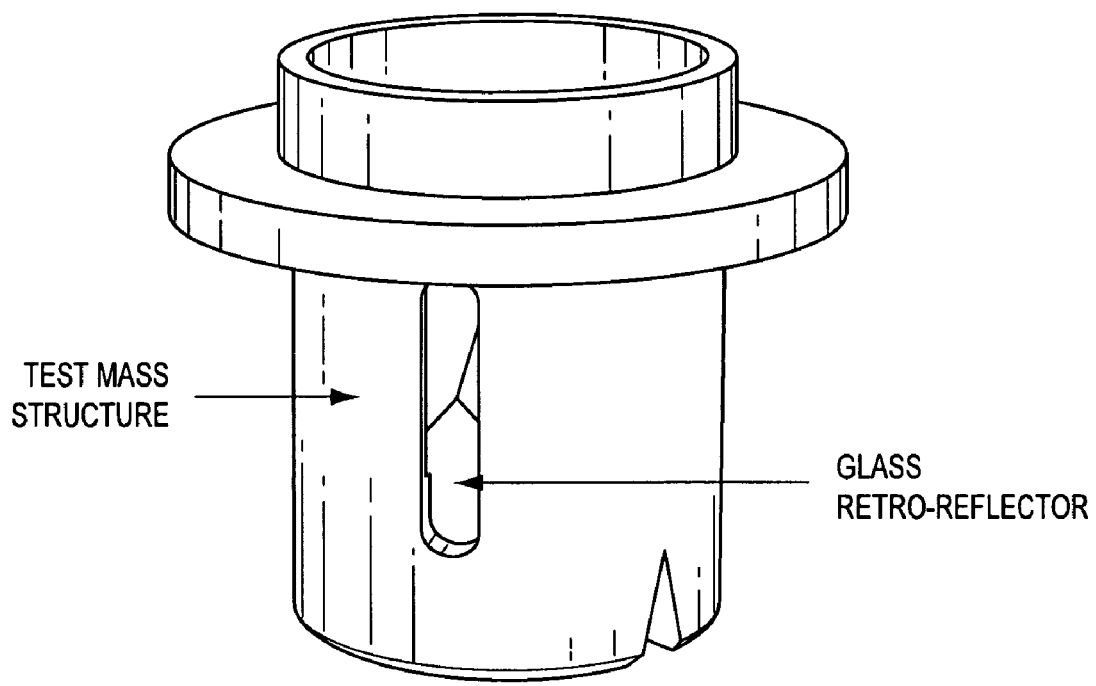
Figure 2D:
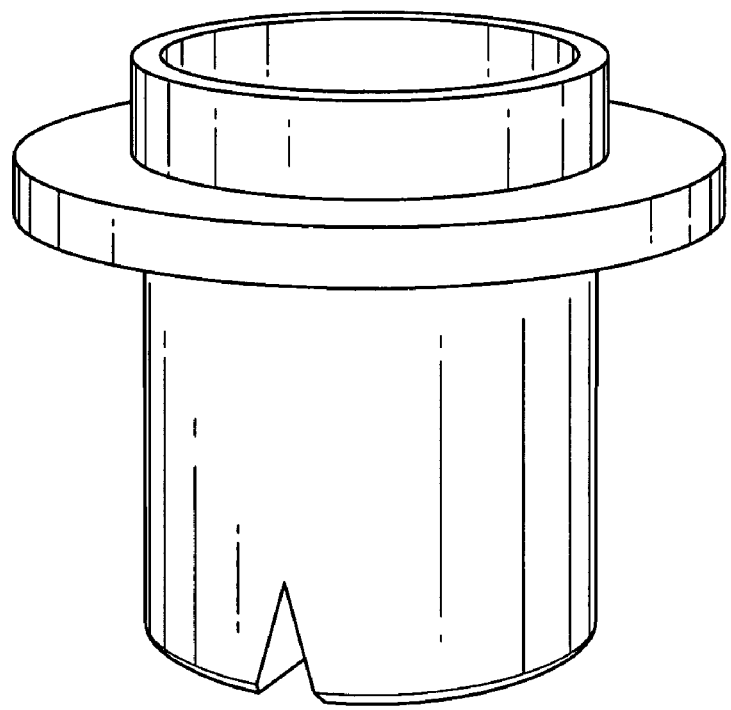
Figure 2E:
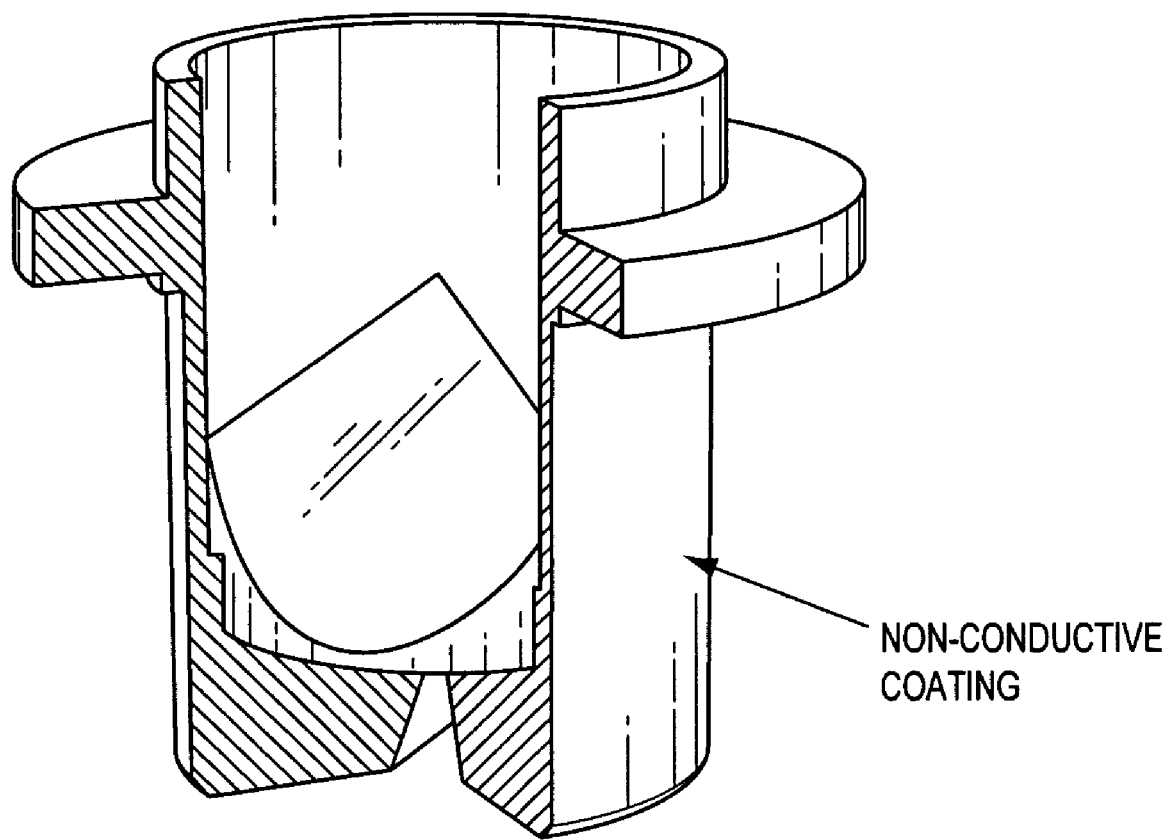

FIGS. 2A-2E illustrate test masses according to particular embodiments of the present invention. FIG. 2A illlustrates a cylindrical test mass containing slits or perforations. FIG. 2B is a cut-away view of the test mass shown in FIG. 2A. A retro-reflector can be seen within the test mass cavity. FIG. 2C is a cylindrical test mass with an alternate perforation pattern, relative to that shown in FIG. 2A. It will be understood that an unlimited number of perforation patterns may be employed in the manufacture of a test mass according to the present invention. The test masses illustrated in FIGS. 2A-2C may be manufactured from conductive or non-conductive materials, and non-conductive materials may be coated with a conductive layer. FIG. 2D illustrates a non-conductive, imperforated test mass. FIG. 2E illustrates a cut-away view of the test mass of FIG. 2D showing the non-conductive test mass and the conductive coating.

It should be understood that various alternatives and modifications of the present invention can be devised by one of skill in the art. Nevertheless, the present invention is intended to embrace all such alternatives, modifications and variances that fall within the scope of the appended claims.

EXAMPLES

The following examples are included to demonstrate particular embodiments of the invention. It should be appreciated by those of skill in the art that the techniques disclosed in the examples which follow represent techniques discovered by the inventor to function well in the practice of the invention, and thus can be considered to constitute particular modes for its practice. However, those of skill in the art should, in light of the present disclosure, appreciate that many changes can be made in the specific embodiments which are disclosed and a like or similar result may still be obtained without departing from the spirit and scope of the invention.

Example 1

Use of a Test Mass According to an Embodiment of the Present Invention Near an Electric or Magnetic Field Perforated, conducting test masses of the present invention were used to replace conventional conducting, imperforated test masses in an FG5 interferometer located near a pumphouse containing an electric motor that produced a large electromagnetic field. Prior to the replacement of the test masses, interference affecting the accuracy of gravity measurements was observed due to the presence of large and unavoidable electromagnetic fields. Upon replacement of the conventional test masses with the perforated test masses, improved accuracy of about $5 \times 10^{-7}$ m·s$^{-2}$ was observed.

What is claimed is:

1. In an apparatus which measures one of absolute gravity or a gravity field gradient, comprising a chamber, a test mass which freefalls within the chamber, a retro reflector connected to the test mass, and an interferometer which includes a laser beam which is projected into the chamber and reflected from the retro reflector during freefall of the test mass to obtain information indicative of the absolute gravity or the gravity field gradient, an improvement to the test mass which avoids inaccuracies arising from attractive and repulsive forces from nearby electromagnetic fields on the freefalling test mass, comprising in combination:

a non-conductive material substantially forming the test mass, the nonconductive material inhibiting eddy current conduction resulting from movement of the test mass through a magnetic field to avoid any induced eddy current-induced magnetic field which attracts or repels the test mass during freefall; and a conductive layer on the nonconductive material which permits conduction of only substantially negligible eddy currents and which discharges any static electrical charge to avoid any induced electrostatic attraction or repulsion of the test mass during freefall.

2. In an apparatus as defined in claim 1, wherein:
the conductive layer is formed with a pattern of perforations which further inhibit formation of eddy currents in the conductive layer.

3. In an apparatus as defined in claim 2, wherein:
the pattern of perforations directs any induced eddy currents to produce any eddy current-induced magnetic field in a direction other than in the freefall direction of the test mass.

4. In an apparatus as defined in claim 2, wherein:
the pattern of perforations eliminate about 25% of a contiguous surface area of the conductive layer.

5. In an apparatus as defined in claim 1, wherein:
the test mass including the nonconductive material and the conductive layer are formed substantially of materials which have negligible gaseous emission in a vacuum.

6. In an apparatus as defined in claim 1, wherein:
the thickness of the conductive layer is about 100 μm or less.

7. In an apparatus as defined in claim 1, wherein:
the conductive layer is formed in a noncontiguous configuration which further inhibits formation of eddy currents in the conductive layer.

8. In an apparatus as defined in claim 7, wherein:
the noncontiguous configuration of the conductive layer is results from elimination of about 25% of a contiguous surface area of the conductive layer.

9. In an apparatus as defined in claim 1, wherein:
the conductive layer comprises an anti-static coating.

10. In an apparatus as defined in claim 1, wherein:
the interferometer has an instrumental uncertainty of about $1 \times 10^{-8}$ ms$^{-2}$ or less.

11. In an apparatus which measures one of absolute gravity or a gravity field gradient, comprising a chamber, an electrically conductive test mass which freefalls within the chamber, a retro reflector connected to the test mass, and an interferometer which includes a laser beam which is projected into the chamber and reflected from the retro reflector during freefall of the test mass to obtain information indicative of the absolute gravity or the gravity field gradient, an improvement to the test mass which avoids inaccuracies arising from attractive and repulsive forces from nearby electromagnetic fields on the freefalling test mass, wherein:

the conductive test mass has a noncontiguous surface configuration which disrupts the natural path of electrons in the test mass caused by eddy currents resulting from movement of the test mass through a magnetic field and which causes the induced eddy currents to produce a magnetic field in a direction other than in the freefall direction of the test mass to thereby avoid attracting or repelling the test mass during freefall.

12. In an apparatus as defined in claim 11, wherein:
the noncontiguous surface configuration is formed by elimination of about 25% of a contiguous surface area of the conductive layer.

13. In an apparatus as defined in claim 11, wherein:
the noncontiguous surface configuration is formed by a pattern of perforations in the conductive layer.

14. In an apparatus as defined in claim 11, wherein:
the conductive test mass discharges any static electrical charge to avoid any induced electrostatic attraction or repulsion of the test mass.

15. In an apparatus as defined in claim 11, wherein:
the test mass is formed substantially of materials which have negligible gaseous emission in a vacuum.

16. In an apparatus as defined in claim 11, wherein:
the interferometer has an instrumental uncertainty of about $1 \times 10^{-8}$ ms$^{-2}$ or less.

17. A method of measuring one of absolute gravity or a gravity field gradient while avoiding inaccuracies arising from attractive and repulsive forces from nearby electromagnetic fields on a freefalling test mass of an apparatus which measures one of absolute gravity or a gravity field gradient by freefalling the test mass in a chamber while a retro reflector connected to the test mass reflects a laser beam projected into the chamber from an interferometer to obtain information indicative of the absolute gravity or the gravity field gradient, wherein the method further comprises:
using a test mass formed substantially of non-conductive material that substantially inhibits eddy current conduction resulting from movement of the test mass through a magnetic field to avoid any induced eddy current-induced magnetic field on the test mass during freefall; and simultaneously
using the same test mass that also has a conductive layer which permits conduction of only substantially negligible eddy currents and which discharges any static electrical charge to avoid any induced electrostatic attraction or repulsion of the test mass while in freefall.

18. A method as defined in claim 17, wherein the conductive layer has a pattern of perforations.

19. A method as defined in claim 18, wherein the pattern of perforations directs any induced eddy currents in the conductive layer to produce an eddy current-induced magnetic field in a direction other than in the freefall direction of the test mass.

20. A method as defined in claim 18, wherein the pattern of perforations eliminates about 25% of a contiguous surface area of the conductive layer.

21. A method as defined in claim 17, wherein the test mass and the nonconductive material and the conductive layer are formed substantially of materials which have negligible gaseous emission in a vacuum.

22. A method as defined in claim 17, wherein the thickness of the conductive layer is about 100 μm or less.

23. A method as defined in claim 17, wherein the conductive layer is formed in a noncontiguous configuration which inhibits formation of eddy currents in the conductive layer.

24. A method as defined in claim 23, wherein the noncontiguous configuration eliminates of about 25% of a contiguous surface area of the conductive layer.

25. A method as defined in claim 17, wherein the conductive layer is an anti-static coating.

26. A method as defined in claim 17, further comprising:
using an interferometer which has an instrumental uncertainty of about $1 \times 10^{-8}$ ms$^{-2}$ or less.

27. A method of measuring one of absolute gravity or a gravity field gradient while avoiding inaccuracies arising from attractive and repulsive forces from nearby electromagnetic fields on a freefalling electrically conductive test mass of an apparatus which measures one of absolute gravity or a gravity field gradient by freefalling the test mass in a chamber while a retro reflector connected to the test mass reflects a laser beam projected into the chamber from an interferometer to obtain information indicative of the absolute gravity or the gravity field gradient, wherein the method further comprises:
using an electrically conductive test mass with a noncontiguous surface configuration which disrupts the natural path of electrons in the test mass caused by eddy currents resulting from movement of the test mass through a magnetic field and which causes the induced eddy currents to produce a magnetic field in a direction other than in the freefall direction of the test mass to avoid attracting or repelling the test mass during freefall.

28. A method as defined in claim 27, wherein the noncontiguous surface configuration is formed by elimination of about 25% of a contiguous surface area of the conductive layer.

29. A method as defined in claim 27, wherein the noncontiguous surface configuration is formed by a pattern of perforations in the conductive layer.

30. A method as defined in claim 27, wherein the conductive test mass discharges any static electrical charge to avoid any induced electrostatic attraction or repulsion of the test mass.

31. A method as defined in claim 27, wherein the test mass is formed substantially of materials which have negligible gaseous emission in a vacuum.

32. A method as defined in claim 27, further comprising:
using an interferometer has an instrumental uncertainty of about $1 \times 10^{-8}$ ms$^{-2}$ or less.

* * * * *